No. 747,285. PATENTED DEC. 15, 1903.
J. F. WHITE.
CONVEYER.
APPLICATION FILED JULY 7, 1903.
NO MODEL. 3 SHEETS—SHEET 2.
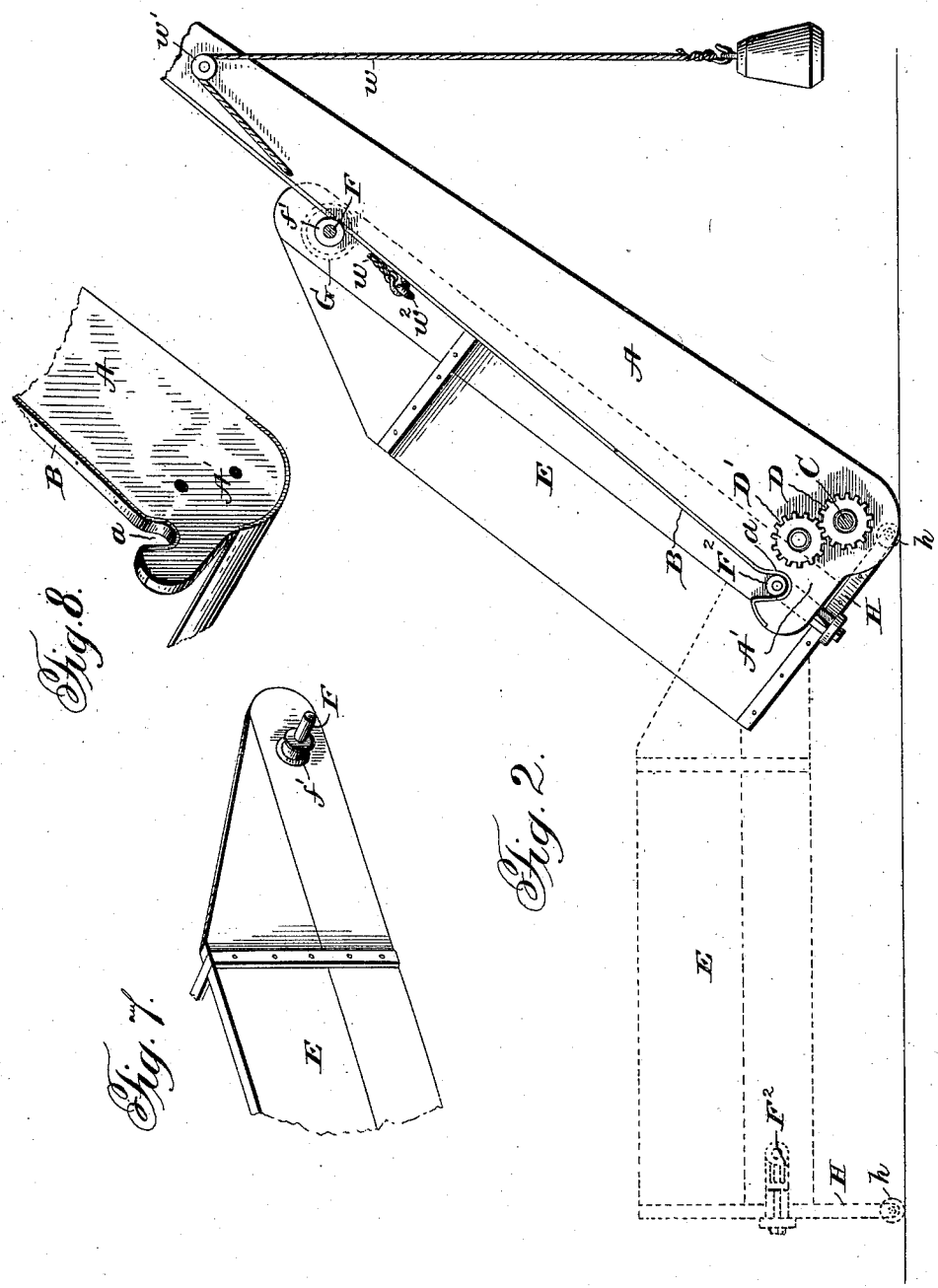

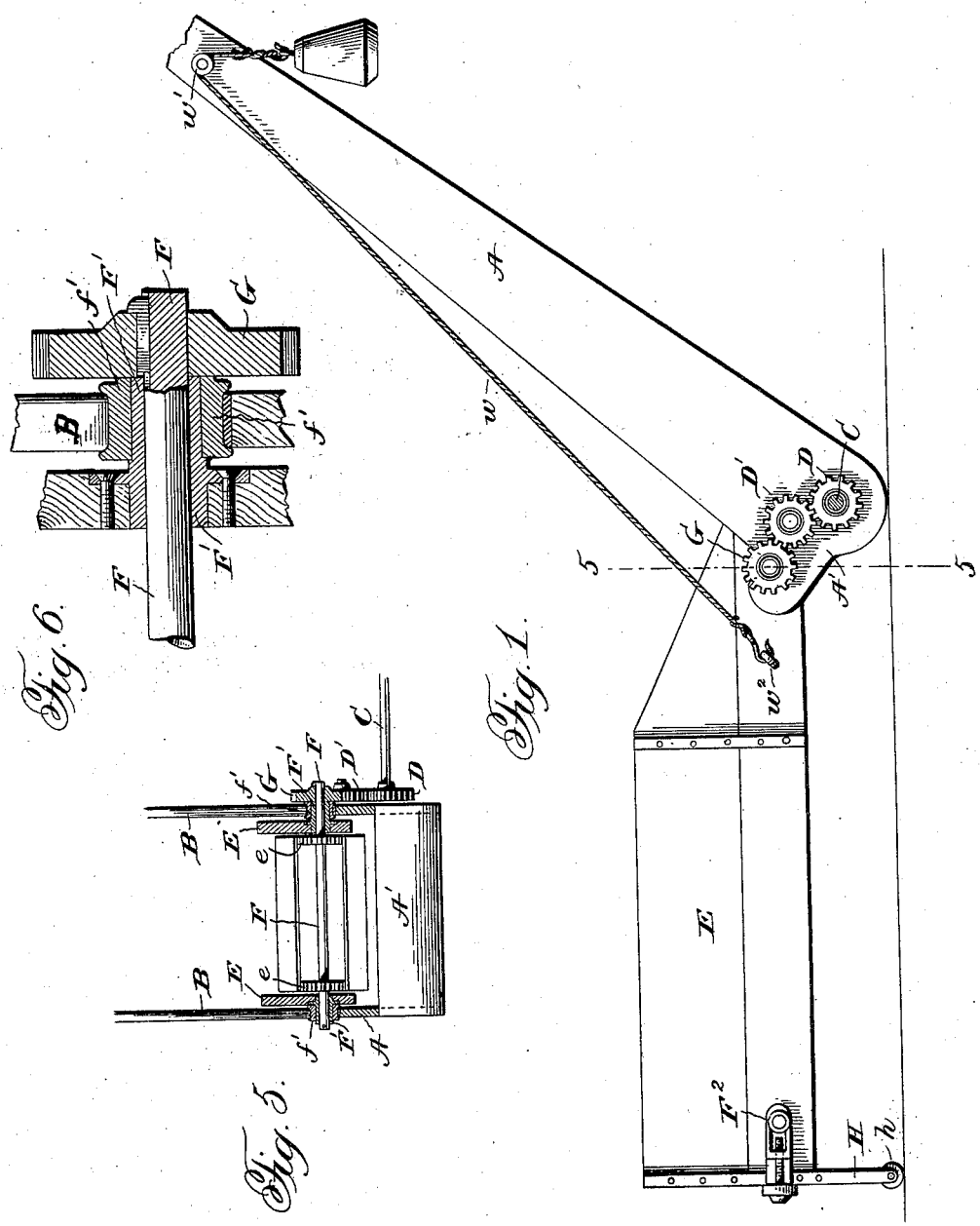

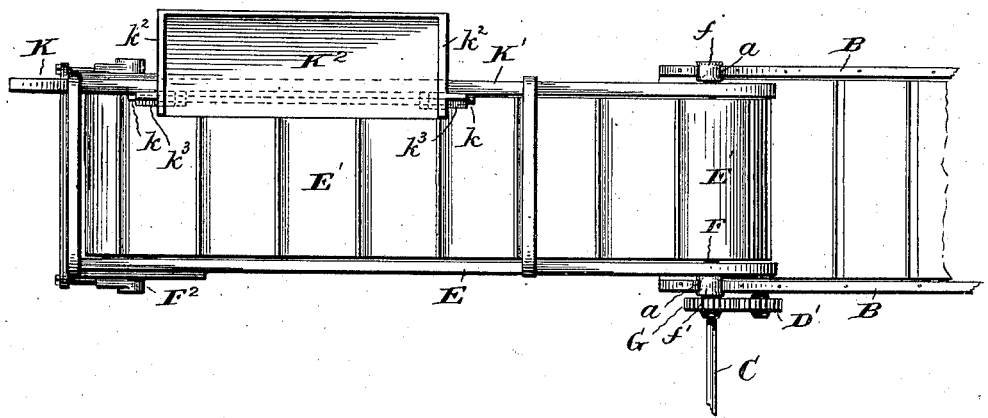
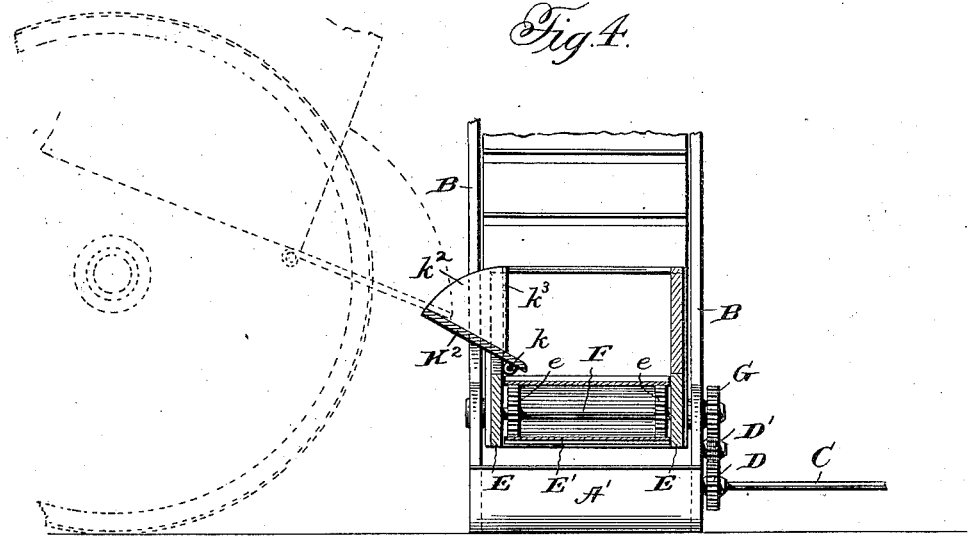
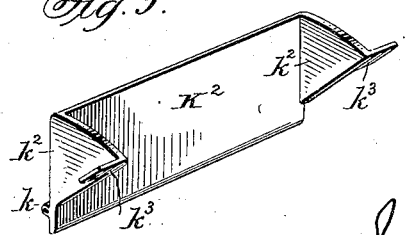

No. 747,285. Patented December 15, 1903.

UNITED STATES PATENT OFFICE.

JOHN F. WHITE, OF BLOOMINGTON, ILLINOIS, ASSIGNOR TO U. S. PORTABLE ELEVATOR CO., OF BLOOMINGTON, ILLINOIS, A CORPORATION OF NEW JERSEY.

CONVEYER.

SPECIFICATION forming part of Letters Patent No. 747,285, dated December 15, 1903.

Application filed July 7, 1903. Serial No. 164,516. (No model.)

*To all whom it may concern:*

Be it known that I, JOHN F. WHITE, a citizen of the United States, residing at Bloomington, in the county of McLean and State of Illinois, have invented certain new and useful Improvements in Conveyers, of which the following is a specification, reference being had therein to the accompanying drawings.

This invention relates to an improvement in conveyers, and is embodied in the construction and arrangement of parts presently to be described, and defined in the claims.

The invention relates more particularly to an improvement in that class of portable conveyers which are employed for transferring grain from a wagon into a granary or bin. At the present time the more usual practice is to associate with a wagon-dumping apparatus a conveyer and what is known as a "drag," this latter device receiving the material as it is dumped from the wagon and conveying it to the elevating-conveyer, from whence the material is discharged into a crib, granary, or other repository. The practice has been to drive the various devices by or from a horse-power, and it has been found largely essential, or at least advantageous, to have the "wagon-dump" as near the ground as possible to avoid hauling the load up long or steep inclines. In the low type of dump, as well as in some of the higher or raised-platform types of dumps, it has been found desirable to so pivotally connect the drag to the conveyer that the former can be swung up and back out of the way of the loaded wagon as it is being driven onto the dump. This pivoted style of drag while being satisfactory in many respects is objectionable for several reasons, but primarily in that there is always more or less strain thrown onto the connecting-gearing when the drag is elevated or lowered, and usually the gearing is of the chain-belt type, which is not altogether satisfactory. As far as I am advised the pivoted or permanently-connected type of drag is at present the type most generally used.

My invention pertains more particularly to a type of drag which while being arranged to be driven by the horse-power is not attached to the conveyer, but rather is susceptible of being removed from its working position and again placed in working position without trouble and without the uncoupling of the gearing. In other words, one of the objects of the invention is the provision of a detached drag in combination with a conveyer and means for driving the conveyer and drag.

A further object is to provide a conveyer with a drag which can be moved back and forth relative to the conveyer without swinging on a pivot and also when necessity requires can be wholly removed to, if desirable, the opposite side of the driveway.

Other features and objects will be presently stated.

In the accompanying drawings is shown one form of the invention; but it is to be understood that the illustrated structure is here employed for the purposes of this specification and that the principle of the invention can be embodied in widely-different structures and the construction shown modified in various ways without departing from this invention.

Figure 1 is a side elevation of the conveyer and the drag, the latter being shown in operative position. Fig. 2 is a similar view showing the drag moved up onto the conveyer-trough. Fig. 3 is a plan view. Fig. 4 is an end view showing the drag in cross-section. Fig. 5 is a cross-section on line 5 5 of Fig. 1. Fig. 6 is an enlarged detail section of the gearing on the drag. Figs. 7 and 8 are detail perspectives of the adjacent ends of the conveyer and drag, and Fig. 9 is a perspective view of the tilting side portion of the drag.

A designates the conveyer, of any approved form, but conveniently of the endless-flight type. This conveyer, as usual, is supported in an inclined position by a derrick or other means. (Not shown.) The conveyer A differs from the usual style in the following particulars: The sides A' gradually increase in width toward the lower end. At the lower end the sides are formed with seats $a$ in the form of vertically-disposed substantially U-shaped grooves, the extreme end portion of the top of the sides being extended slightly, as shown, thereby constituting, in effect, retaining-hooks. The upper edge of the sides of the conveyer is provided conveniently with metal tracks B, which extend into the hooks or seats a.

Passing through the lower end of the conveyer is the power-shaft C, extending from any suitable source of power and having thereon the usual sprockets for driving the conveyer-flights. This shaft is also provided with a large gear D, which meshes with an idler-gear D', mounted conveniently on a stub-shaft on the side of the conveyer approximately directly above the shaft C. These gears are, as shown, located on the outside of the conveyer.

E designates the drag, which may be of the usual or any approved form, having an endless conveyer-belt E' thereon, which passes over suitable wheels or pulleys in the opposite ends of the drag-frame. The wheels $e$ at the forward end of the drag are mounted on the shaft F, the ends of which are extended through and journaled in suitable tubular boxes F'. These boxes are formed with tubular extensions projecting beyond the sides of the drag, and they are secured to the drag by having the bearings thereof lying in recesses formed in the sides of the drag, suitable screws passing through the bearings into the sides. On the outer tubular extensions of the boxes F' are flanged rollers $f'$, designed to run on the tracks on the edges of the sides of the conveyer A when the drag is being elevated or moved back into the position shown in Fig. 2. At one end the shaft F is extended beyond the box F' and has keyed thereon a gear G, which when the parts are in operative position engages and meshes with the rear portion of the idler D', so that the movement of the power-shaft will be transmitted to the drag through gears D, D', and G. By the employment of the idler D' the proper direction of travel is imparted to the belt E', and by the special positioning of the idler its movement tends to force the drag back from the conveyer, and thereby firmly seat the projecting ends of the boxes F' and their flanged rolls in the seats $a$, where they are held by the overhanging hook portions. The ends of the rear-axle boxes $F^2$ also extend beyond the sides of the drag and are placed in the retaining-seats $a$ when the drag is moved up onto the conveyer, as shown in Fig. 2. At the outer end of the drag are legs H, having suitable casters $h$ thereon.

In operation it is only necessary to first lift the inner end of the drag up and then forward until the flanged rollers rest on the track $a$ and then shove the drag up the inclined track until the rear of the drag has approached the end of the conveyer. The rear end of the drag is then lifted up and the ends of boxes $F^2$ placed in the seats $a$, thereby holding the drag in its elevated position. To assist in raising the drag, a weight may be employed, which is carried by ropes $w$, extending over pulley $w'$ and removably hooked into staples $w^2$ on the sides of the drag. This feature while desirable is, however, not wholly essential and may be omitted when it is desired to move the drag to the opposite side of the driveway.

The hopper portion of the drag is formed conveniently with longitudinally-movable side pieces K K', intermediate the ends of which is a pivoted chute $K^2$. This chute has pivots $k$ at its lower end mounted in the movable sides K K' and is provided with right-angle substantially V-shaped wings $K^2$, from the ends of which extend flanges or stops $k^3$, which when the chute is lowered strike the parts K K', and thus limit the movement of the chute. In Fig. 4 is shown in dotted lines the end of a wagon in a dumping position, the end-board being over the chute $K^2$. By making the sides K K' movable longitudinally the position of the chute can be changed. The longitudinal adjustment of the sides is shown in my Letters Patent No. 722,788, dated March 17, 1903. The special construction of chute permits the proper positioning of the drag under the end of the wagon and also serves as a convenient form of conductor for the grain, preventing spilling.

Having thus described the invention, what is claimed as new, and desired to be secured by Letters Patent, is—

1. In a conveyer of the character described the combination with a conveyer, of a detached drag associated therewith, a power-shaft, and gearing driven by the power-shaft for actuating the drag and conveyer.

2. In a portable conveyer the combination with a conveyer, a detached drag associated therewith, and means for actuating the same.

3. In a portable conveyer, a detached drag and gearing for actuating the drag.

4. In a portable conveyer, the combination with a conveyer, of a drag slidably associated with the conveyer, and means for actuating the conveyer and drag.

5. In a portable conveyer the combination with a conveyer having a track thereon, of a drag arranged to move on said track.

6. In a portable conveyer the combination with a conveyer, of a drag arranged to slide thereon, and means for retaining the drag in different positions of adjustment.

7. In a portable conveyer the combination with a conveyer, of a drag arranged to slide thereon, and seats for retaining the drag in different positions of adjustment.

8. In a portable conveyer the combination with a conveyer, of a drag arranged to slide thereon, and hooked portions for retaining the drag in different positions of adjustment.

9. In a portable conveyer the combination with a power-shaft, a conveyer and a detached drag, of gear-wheels on the drag and on the shaft respectively, and an idler interposed between and meshing with the gear-wheels.

10. In a portable conveyer the combination with a conveyer and a power-shaft, of a drag and gearing acting to secure the drag against movement and for actuating the conveyer and drag.

11. In a portable conveyer the combination with a conveyer, of a drag slidably associated therewith, and a weight for assisting in the sliding movement of the drag.

12. The combination with a drag, of a longitudinally-adjustable pivoted chute connected with the sides of the drag.

13. The combination with a drag, of a longitudinally-adjustable pivoted chute at the side thereof, and wings on the sides of the chute.

14. The combination with a drag, of a longitudinally-movable chute pivoted thereto having wings at its ends, and stops on the wings.

In testimony whereof I affix my signature in presence of two witnesses.

JOHN F. WHITE.

Witnesses:
MABEL DAVISON,
JAMES EASTMAN.